United States Patent
Sugawara et al.

(10) Patent No.: US 12,510,417 B2
(45) Date of Patent: Dec. 30, 2025

(54) THERMOSENSITIVE PROBE

(71) Applicant: NIHON KOHDEN CORPORATION, Tokyo (JP)

(72) Inventors: Hironori Sugawara, Tokorozawa (JP); Hiroshi Kubo, Tokorozawa (JP); Kohei Otaka, Tokorozawa (JP); Takuma Sano, Tokorozawa (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 493 days.

(21) Appl. No.: 17/756,691

(22) PCT Filed: Nov. 27, 2020

(86) PCT No.: PCT/JP2020/044308
§ 371 (c)(1),
(2) Date: May 31, 2022

(87) PCT Pub. No.: WO2021/112012
PCT Pub. Date: Jun. 10, 2021

(65) Prior Publication Data
US 2022/0381620 A1   Dec. 1, 2022

(30) Foreign Application Priority Data
Dec. 3, 2019   (JP) .................. 2019-218547

(51) Int. Cl.
*G01K 1/08*   (2021.01)
*G01K 1/18*   (2006.01)
(Continued)

(52) U.S. Cl.
CPC ................ *G01K 1/08* (2013.01); *G01K 1/18* (2013.01); *G01K 7/16* (2013.01); *G01K 13/20* (2021.01)

(58) Field of Classification Search
CPC .. G01K 7/22; G01K 7/18; G01K 1/12; G01K 1/16; G01K 1/08; G01D 11/245
See application file for complete search history.

(56) References Cited

U.S. PATENT DOCUMENTS 5,367,282 A * 11/1994 Clem ..................... H01C 1/028
                                                                338/26
5,999,081 A * 12/1999 Hannigan ................ G01K 1/16
                                                                374/185

(Continued)

FOREIGN PATENT DOCUMENTS

CN       105784162 A  *  7/2016  ............... G01K 1/08
DE    102015114314 A1 *  3/2017  ............... B22F 3/10

(Continued)

OTHER PUBLICATIONS

Aluminum Oxide | Al2O3 Material Properties. (n.d.). https://accuratus.com/alumox.html.*

(Continued)

*Primary Examiner* — John E Breene
*Assistant Examiner* — Janice M Soto
(74) *Attorney, Agent, or Firm* — Sughrue Mion, PLLC (57) ABSTRACT

A thermosensitive probe includes: a non-metallic thermoconductive member defining a housing space; a thermosensitive element disposed in the housing space; and a coupling member having a portion surrounding the thermosensitive element in the housing space while fixing the thermosensitive element to the thermoconductive member.

15 Claims, 10 Drawing Sheets

(51) Int. Cl.
*G01K 7/16* (2006.01)
*G01K 13/20* (2021.01)

(56) References Cited

U.S. PATENT DOCUMENTS

| | | | |
|---|---|---|---|
| 6,568,849 B1* | 5/2003 | Chen | G01K 1/08 374/185 |
| 2006/0106365 A1* | 5/2006 | Lane | G01K 13/25 374/E1.022 |
| 2007/0189358 A1 | 8/2007 | Lane et al. | |
| 2008/0137709 A1 | 6/2008 | Quinn et al. | |
| 2009/0110029 A1 | 4/2009 | Bradley et al. | |
| 2009/0110378 A1* | 4/2009 | Bradley | A61M 16/0841 392/441 |
| 2010/0322282 A1 | 12/2010 | Lane et al. | |
| 2011/0051774 A1 | 3/2011 | Quinn et al. | |
| 2019/0187002 A1* | 6/2019 | Baba | G01K 7/22 |
| 2021/0215549 A1 | 7/2021 | Suzuki | |

FOREIGN PATENT DOCUMENTS

| | | |
|---|---|---|
| EP | 2 056 082 A2 | 5/2009 |
| JP | S59-154626 U | 10/1984 |
| JP | S61-082125 A | 4/1986 |
| JP | S63-046701 A | 2/1988 |
| JP | 3030213 B2 * | 4/2000 |
| JP | 2008-520972 A | 6/2008 |
| KR | 20110075844 A * | 7/2011 |
| WO | 2019/159221 A1 | 8/2019 |

OTHER PUBLICATIONS

Thermal conductivity of Teflon ®. Thermtest. (Jul. 31, 2024). https://thermtest.com/application/thermal-conductivity-of-teflon#:~:text =In%20this%20application%2C%20we%20investigated,a%20thermal%20conductivity%20of%200.304.*
Understanding how to choose an appropriate thermally . . . (n.d.). https://www.epotek.com/docs/en/Related/Tech%20Tip%2030%20Understanding%20How%20to%20Choose%20an%20Appropriate%20Thermally%20Conductive%20Epoxy.pdf.*
European Search Report issued in Application No. 20 824 699.1 dated Apr. 18, 2023.
International Search Report dated Jun. 9, 2021 issued in Patent Application No. PCT/JP2020/044308.
Written Opinion dated Jun. 9, 2021 issued in Patent Application No. PCT/JP2020/044308.
Japanese Office Action dated Oct. 10, 2023 issued in Japanese Patent Application No. 2019-218547.

* cited by examiner

THERMOSENSITIVE PROBE

TECHNICAL FIELD

The presently disclosed subject matter relates to a thermosensitive probe. In particular, the presently disclosed subject matter relates to a medical thermosensitive probe adapted to be used to measure a body temperature of a subject.

BACKGROUND

Japanese Patent No. 3030213B discloses a temperature measuring device as an example of such a thermosensitive probe. The temperature measuring device includes a cap made of ceramics and surrounding a thermosensitive element. The cap is in contact with the thermosensitive element. The cap forms a portion of an exterior surface of the temperature measuring device. When the exterior surface of the temperature measuring device is brought into contact with the object, heat of the object is transferred to the thermosensitive element via the cap. The thermosensitive element changes in characteristics such as a resistance value in response to a temperature change. By acquiring a signal corresponding to the characteristic change, the temperature of the object can be measured.

SUMMARY

Technical Problem

It is demanded to suppress the influence of an ambient temperature on the thermosensitive element while satisfying the demand for the responsiveness of the thermosensitive element with respect to the temperature change of the object.

Solution to Problem

An illustrative aspect of the presently disclosed subject matter provides a thermosensitive probe comprising:
- a non-metallic thermoconductive member defining a housing space;
- a thermosensitive element disposed in the housing space; and
- a coupling member having a portion surrounding the thermosensitive element in the housing space while fixing the thermosensitive element to the thermoconductive member.

As a result of repeated studies, the inventors of the present application has adopted a configuration in which the thermosensitive element disposed in the housing space is intentionally surrounded by the coupling member for fixing the thermosensitive element to the thermoconductive member. By interposing the coupling member between the thermoconductive member and the thermosensitive element, it was successful to suppress the influence of the ambient temperature on the thermosensitive element while maintaining the responsiveness of the thermosensitive element to the temperature change of the object at a satisfactory level.

DESCRIPTION OF EMBODIMENTS

Examples of embodiments will be described in detail below with reference to the accompanying drawings. In each of the drawings used in the following descriptions, the scale is appropriately changed in order to make each member have a recognizable size.

Figure 1:
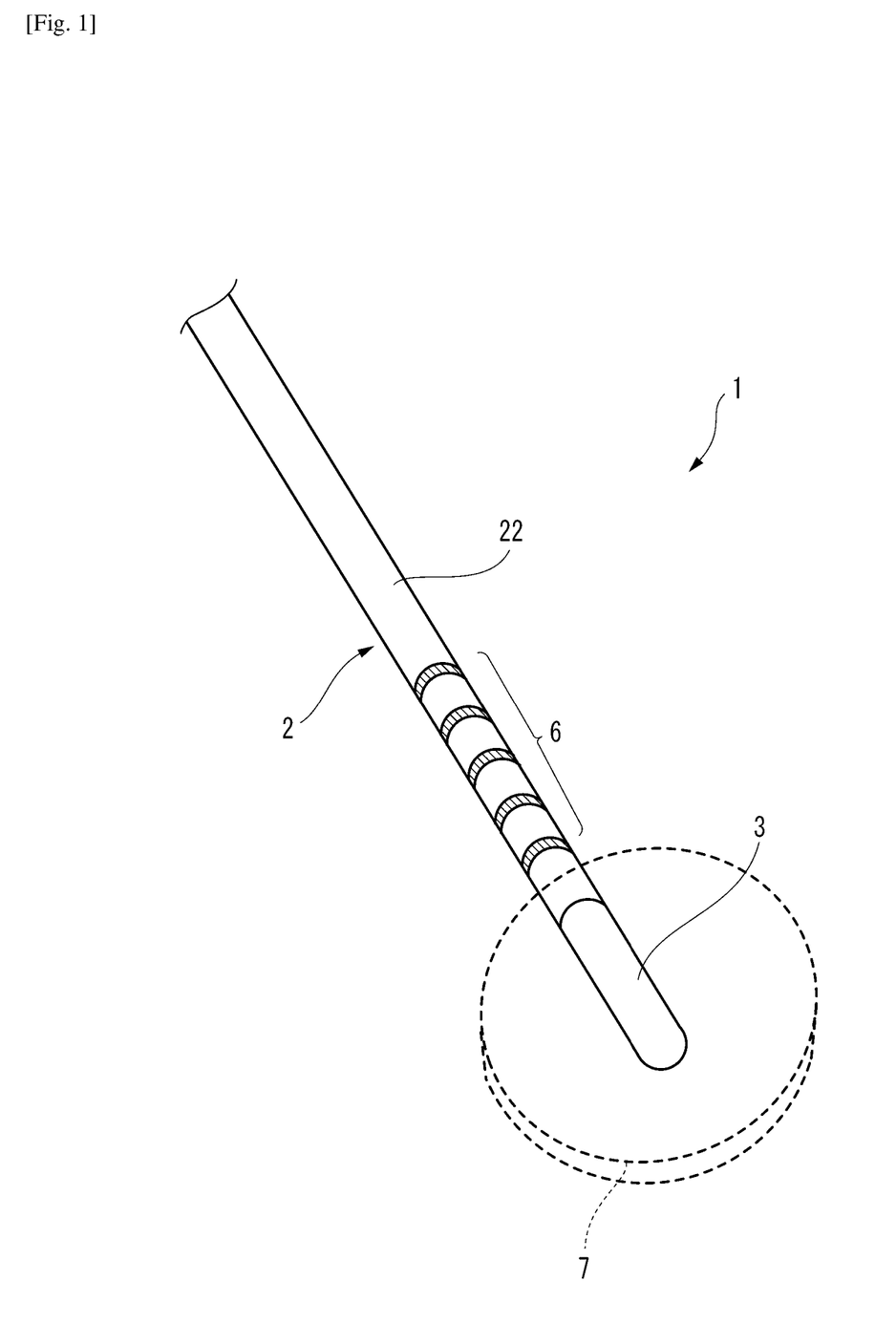
FIG. 1 illustrates an appearance of a thermosensitive probe according to one embodiment.

FIG. 1 illustrates an appearance of a thermosensitive probe 1 according to an embodiment. The thermosensitive probe 1 includes a main body portion 2 and a thermosensitive portion 3. The main body portion 2 has an elongated appearance. The main body portion 2 has flexibility. The thermosensitive portion 3 is provided at one end portion in the elongated direction of the main body portion 2. The other end portion of the main body portion 2 in the elongated direction is connected to a temperature measuring device (not illustrated).

The thermosensitive probe 1 is adapted to be so used that the thermosensitive portion 3 contacts an object to be measured for temperature. For example, the main body portion 2 is inserted into a rectum or an esophagus of a subject, and the thermosensitive portion 3 is positioned at a desired position.

Figure 2:
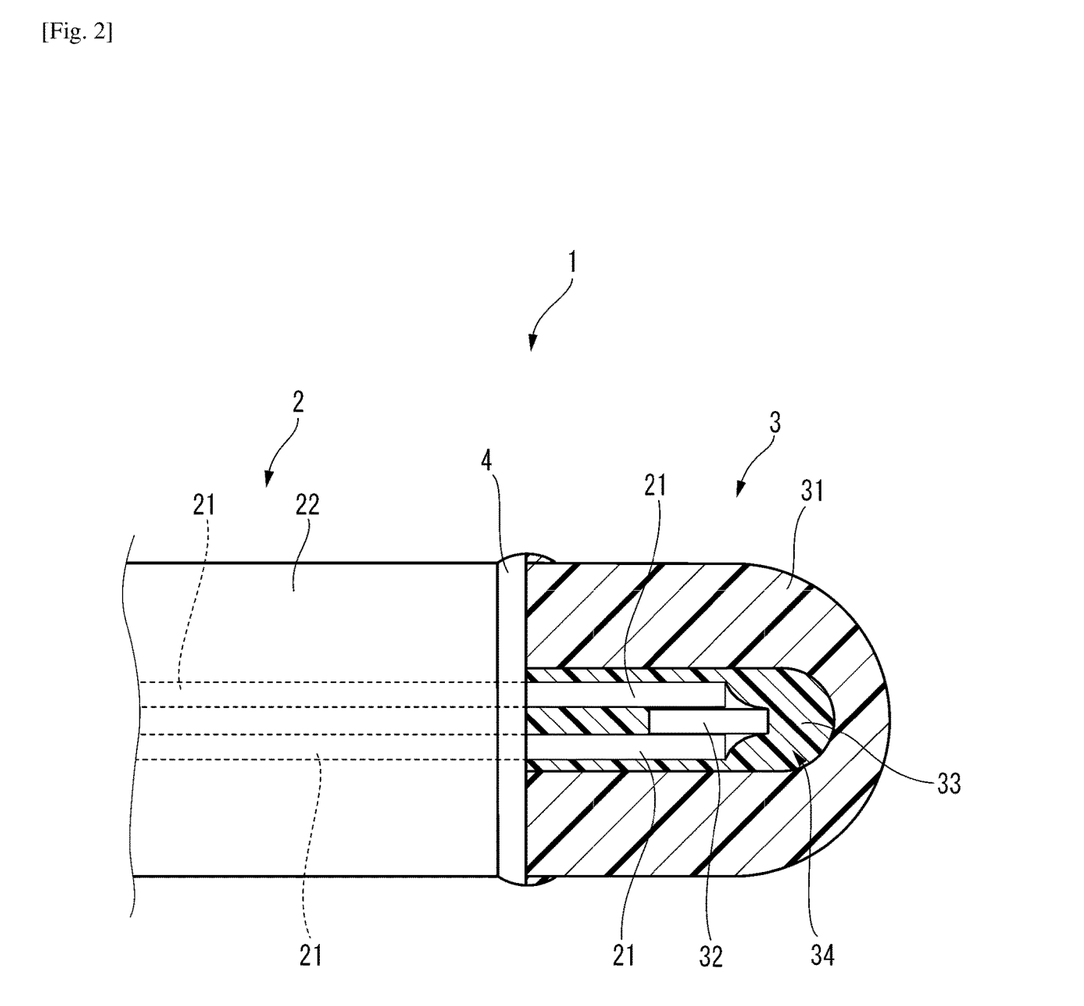
FIG. 2 illustrates a first example of the internal configuration of the thermosensitive probe of FIG. 1.

FIG. 2 illustrates a first example of the internal configuration of the thermosensitive probe 1 in a partial cross-sectional view. The thermosensitive portion 3 includes a thermoconductive member 31, a thermosensitive element 32, and a coupling member 33.

The thermoconductive member 31 is a non-metallic member. Examples of the material for forming the thermoconductive member 31 include a fine ceramic material such as alumina, silicon carbide, or silicon nitride, a resin material containing such a fine ceramic material, diamond, sapphire, or the like as a filler. The thermoconductive member 31 defines a housing space 34.

The thermosensitive element 32 is an element whose characteristics such as a resistance value change in accordance with a temperature change. Examples of the thermosensitive element 32 include a thermistor, a thermocouple, and a temperature measuring resistor. The thermosensitive element 32 is disposed in the housing space 34.

The coupling member 33 has a portion enclosing the thermosensitive element 32 in the housing space 34. In other words, the coupling member 33 is a member that couples the thermoconductive member 31 and the thermosensitive element 32 so as to transfer heat from the thermoconductive member 31 to the thermosensitive element 32. Examples of the coupling member 33 include an epoxy resin.

As a result of repeated studies, the inventors of the present application has adopted a configuration in which the thermosensitive element 32 disposed in the housing space 34 is intentionally surrounded by the coupling member 33 for fixing the thermosensitive element 32 to the thermoconductive member 31. By interposing the coupling member 33 between the thermoconductive member 31 and the thermosensitive element 32, it was successful to suppress the influence of the ambient temperature on the thermosensitive element 32 while maintaining the responsiveness of the thermosensitive element 32 to the temperature change of the object at a satisfactory level.

Specifically, the thermal conductivity of the thermoconductive member 31 may be selected to be higher than the thermal conductivity of the coupling member 33.

The main body portion 2 includes a core wire 21. The core wire 21 is electrically connected to the thermosensitive element 32. Examples of the core wire 21 include a tin-plated soft copper wire. The core wire 21 extends along the elongated direction of the main body portion 2, and is connected to the temperature measuring device via a connector (not illustrated). As a result, the core wire 21 electrically connects the thermosensitive element 32 and the temperature measuring device.

The main body portion 2 includes a sheath 22. The sheath 22 partially surrounds the core wire 21. The sheath 22 has an electrically insulative property. The sheath 22 may be formed of, for example, a PVC (polyvinyl chloride) resin.

The thermal conductivity of the sheath 22 may be selected to be lower than the thermal conductivity of the coupling member 33. This relationship can mainly contribute to suppressing the influence of the ambient temperature on the thermosensitive element 32.

The thermosensitive probe 1 may include a coating layer 4. The coating layer 4 has an electrically insulative property. The coating layer 4 may be formed of, for example, PVC (polyvinyl chloride) resin. The coating layer 4 is provided in a region extending over the sheath 22 and the thermoconductive member 31.

According to such a configuration, not only the separation of the sheath 22 and the thermoconductive member 31 during the use of the thermosensitive probe 1 can be prevented, but also the resistance when the thermosensitive probe 1 is in sliding contact with a measurement site of the subject can be reduced.

Figure 3:
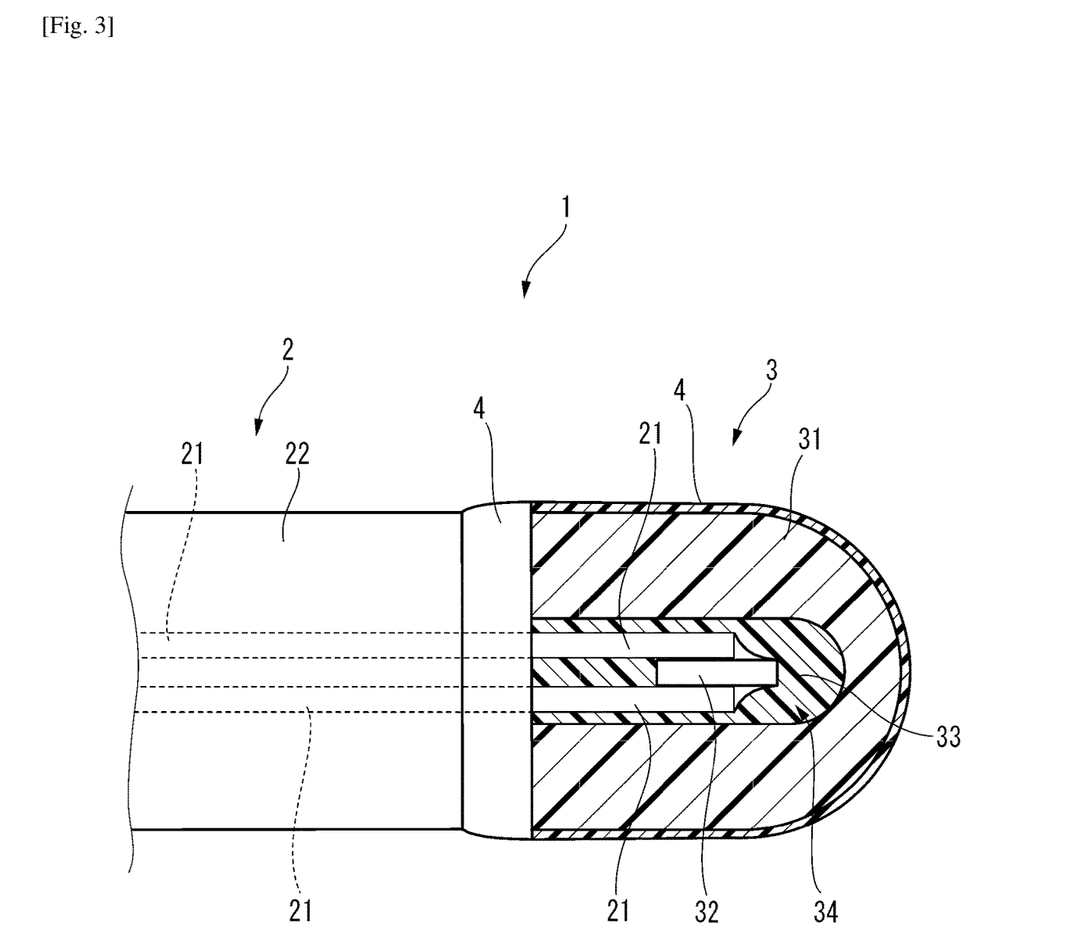
FIG. 3 illustrates a second example of the internal configuration of the thermosensitive probe of FIG. 1.

FIG. 3 illustrates a second example of the internal configuration of the thermosensitive probe 1 in a partial cross-sectional view. In this example, the entire thermoconductive member 31 is covered with the coating layer 4.

According to such a configuration, it is possible to further reduce the sliding contact resistance of the thermosensitive probe 1 with respect to the subject. In particular, in a case where the coating layer 4 is formed of the same material as the sheath 22, it is possible to suppress a sense of discomfort that would be imparted due to the difference in material between the sheath 22 and the thermoconductive member 31 when the thermosensitive probe 1 is in sliding contact with the subject.

Figure 4:
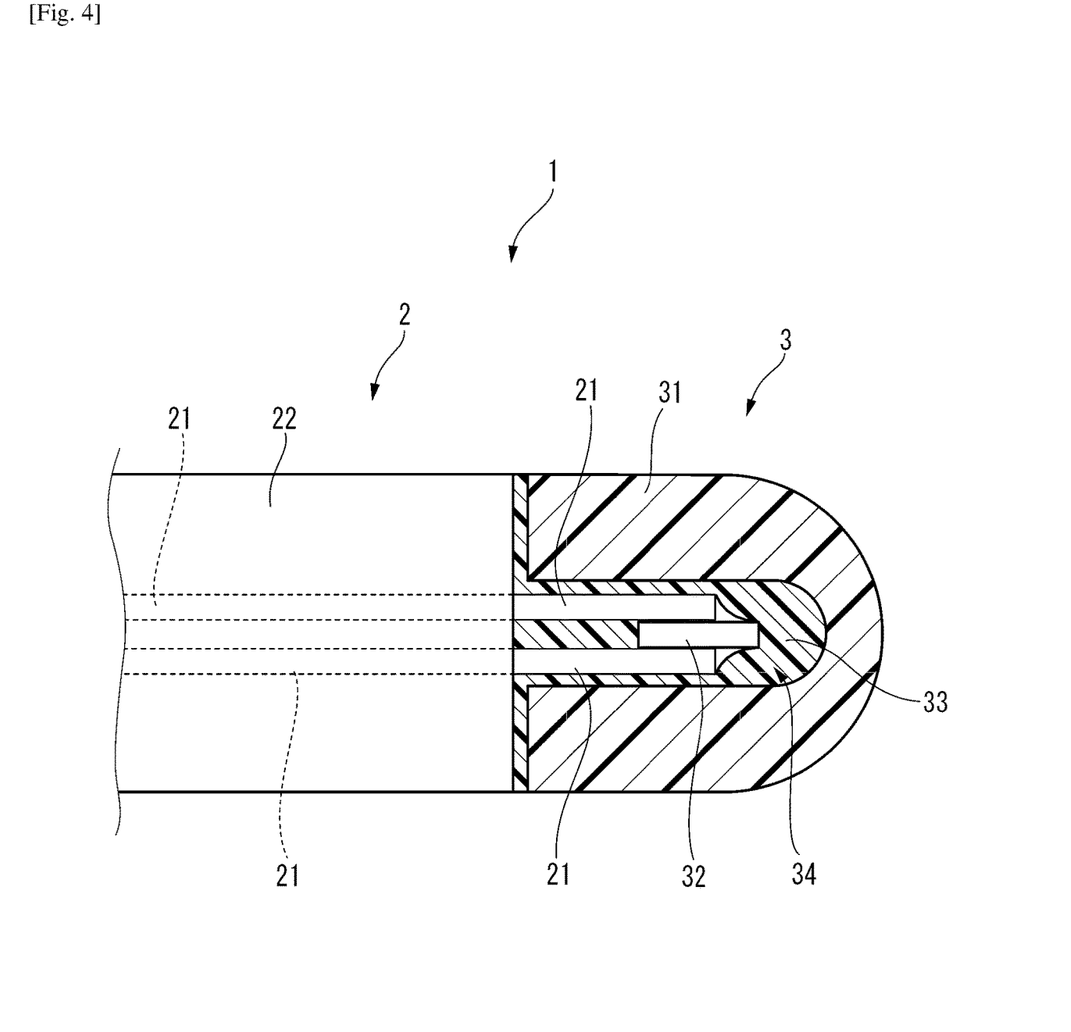
FIG. 4 illustrates a third example of the internal configuration of the thermosensitive probe of FIG. 1.

FIG. 4 illustrates a third example of the internal configuration of the thermosensitive probe 1 in a partial cross-sectional view. In this example, the sheath 22 and the thermoconductive member 31 are coupled by way of the coupling member 33. As a result, the coupling between the sheath 22 and the thermoconductive member 31 is strengthened, so that the separation of the sheath 22 and the thermoconductive member 31 during the use of the thermosensitive probe 1 can be more reliably prevented.

Also in this example, the thermosensitive probe 1 may include the coating layer 4 in the same manner as the first example illustrated in FIG. 2 or the second example illustrated in FIG. 3.

Figure 5:
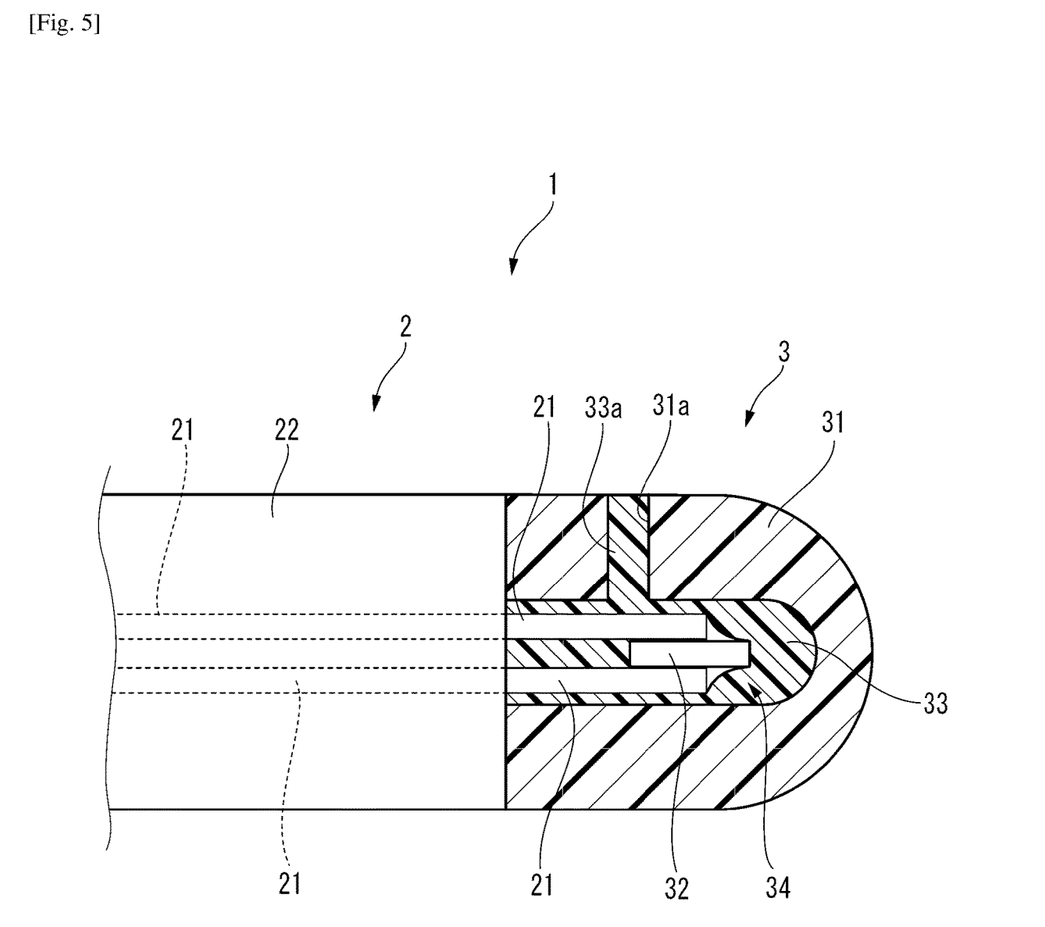
FIG. 5 illustrates a fourth example of the internal configuration of the thermosensitive probe of FIG. 1.

FIG. 5 illustrates a fourth example of the internal configuration of the thermosensitive probe 1 in a partial cross-sectional view. In this example, a hole 31a is formed in the thermoconductive member 31. The hole 31a is formed so as to communicate the housing space 34 with the outside of the thermoconductive member 31. The coupling member 33 is filled in the housing space 34 through the hole 31a and solidified. Accordingly, a portion 33a of the coupling member 33 is filled even in the hole 31a.

According to such a configuration, it is possible to cause the portion 33a of the coupling member 33 filled in the hole 31a to serve as a stopper for preventing the thermoconductive member 31 from falling off from the coupling member 33 during use of the thermosensitive probe 1.

Also in this example, the thermosensitive probe 1 may include the coating layer 4 in the same manner as the first example illustrated in FIG. 2 or the second example illustrated in FIG. 3.

Figure 6:
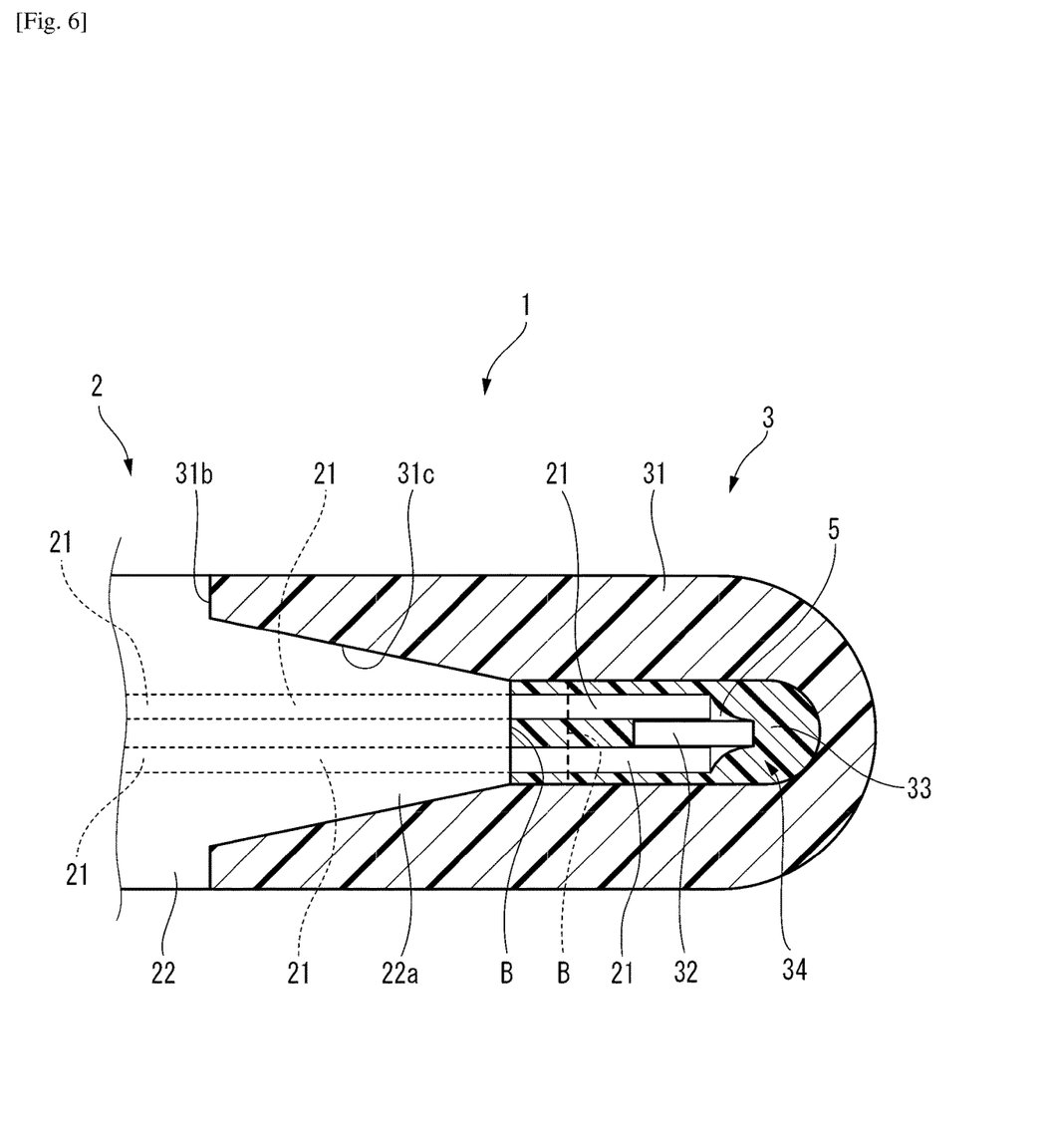
FIG. 6 illustrates a fifth example of the internal configuration of the thermosensitive probe of FIG. 1.

FIG. 6 illustrates a fifth example of the internal configuration of the thermosensitive probe 1 in a partial cross-sectional view. The thermoconductive member 31 has an end portion 31b in which an opening communicating with the housing space 34 is formed. In this example, a boundary B between the core wire 21 and the sheath 22 is located between the end portion 31b and the thermosensitive element 32.

Specifically, a distal end portion 22a of the sheath 22 (an end portion on the side closer to the thermosensitive element 32) is shaped so as to gradually decrease in diameter. On the other hand, a hole 31c whose diameter gradually decreases toward the thermosensitive element 32 is formed between the end portion 31b of the thermoconductive member 31 and the housing space 34. The distal end portion 22a of the sheath 22 is inserted into the hole 31c of the thermoconductive member 31.

According to such a configuration, for example, as compared with the third example illustrated in FIG. 4, a creepage distance of the electrically-insulative sheath 22 can be increased. Accordingly, the electrically insulative property of the thermosensitive element 32 with respect to the outside is enhanced.

From the viewpoint of increasing the creepage distance of the sheath 22, as indicated by the dashed lines, the boundary B between the core line 21 and the sheath 22 may be disposed in the vicinity of the thermosensitive element 32 to an extent that is located in the housing space 34.

In this example, it is preferable that the core wire 21 and the thermosensitive element 32 are joined by a low-temperature solder 5. In this case, even if the distance between the boundary B and the thermosensitive element 32 is short, it is possible to prevent the sheath 22 from being shrunk and deformed by heat generated during the soldering.

Also in this example, the thermosensitive probe 1 may include the coating layer 4 in the same manner as the first example illustrated in FIG. 2 or the second example illustrated in FIG. 3. In addition, similarly to the fourth example illustrated in FIG. 5, the hole 31a may be formed in the thermoconductive member 31.

Figure 7:
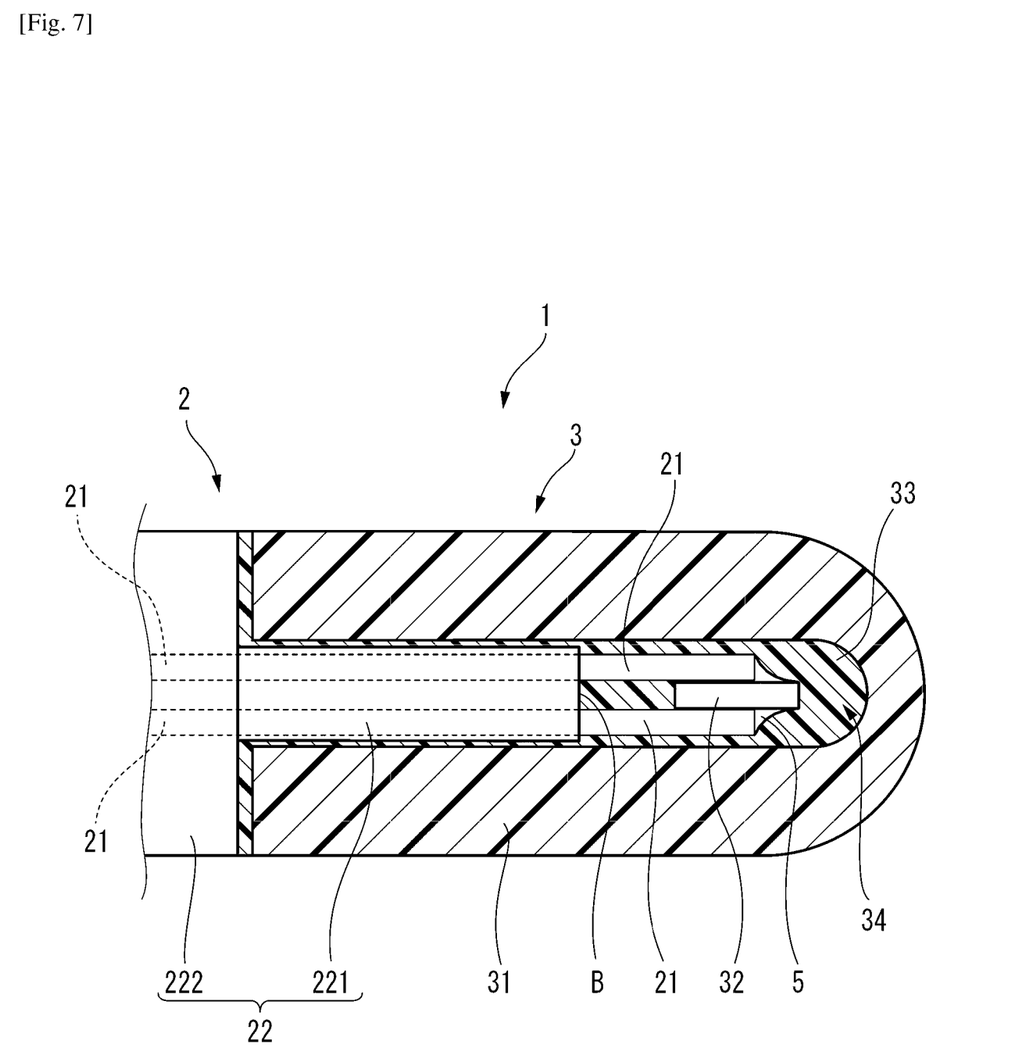
FIG. 7 illustrates a sixth example of the internal configuration of the thermosensitive probe of FIG. 1.

FIG. 7 illustrates a sixth example of the internal configuration of the thermosensitive probe 1 in a partial cross-sectional view. In this example, the sheath 22 includes a first sheath 221 and a second sheath 222.

The first sheath 221 partially surrounds the core wire 21. That is, the first sheath 221 forms the boundary B with the core wire 21. The boundary B is located in the housing space 34. The first sheath 221 has an electrically insulative property.

The second sheath 222 partially surrounds the first sheath 221. The second sheath 222 is coupled to the thermoconductive member 31. The second sheath 222 has an electrically insulative property. The second sheath 222 may be formed of, for example, a PVC (polyvinyl chloride) resin.

According to such a configuration, for example, as compared with the third example illustrated in FIG. 4, a creepage distance of the electrically-insulative sheath 22 can be increased. Accordingly, the electrically insulative property of the thermosensitive element 32 with respect to the outside is enhanced.

Also in this example, it is preferable that the core wire 21 and the thermosensitive element 32 are joined by the low-temperature solder 5. In this case, even if the distance between the boundary B and the thermosensitive element 32 is short, it is possible to prevent the first sheath 221 from being shrunk and deformed by heat generated during the soldering.

In this example, it is preferable that the first sheath 221 is formed of a material containing a fluorine resin. Since the material has high thermal resistance, it is possible to more reliably prevent the first sheath 221 from shrinking and deforming by heat generated during the soldering of the core wire 21 and the thermosensitive element 32.

Also in this example, the thermosensitive probe 1 may include the coating layer 4 in the same manner as the first example illustrated in FIG. 2 or the second example illustrated in FIG. 3. In addition, similarly to the fourth example illustrated in FIG. 5, the hole 31a may be formed in the thermoconductive member 31.

Figure 8:
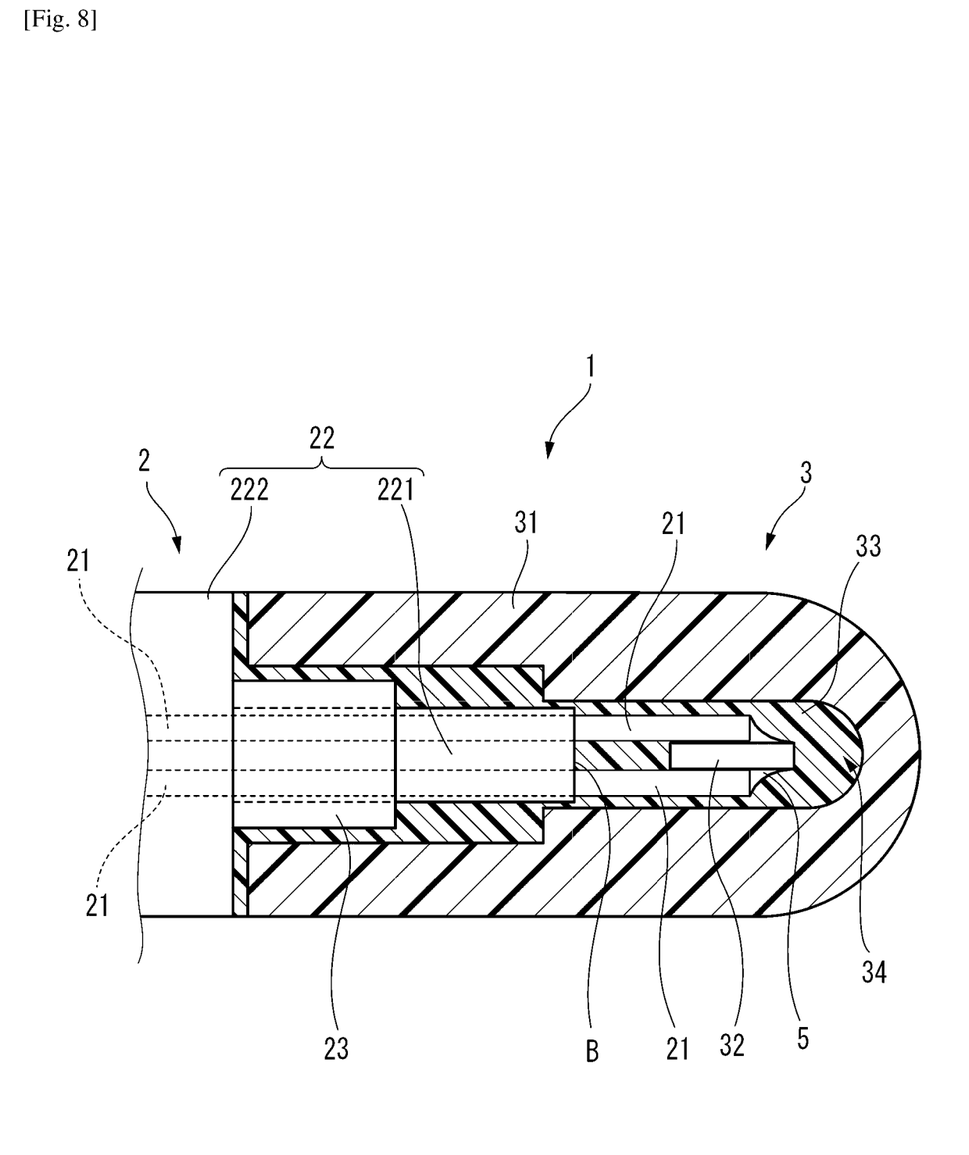
FIG. 8 illustrates a seventh example of the internal configuration of the thermosensitive probe of FIG. 1.

FIG. 8 illustrates a seventh example of the internal configuration of the thermosensitive probe 1 in a partial cross-sectional view. In this example, the main body portion 2 includes an electrically conductive shield 23. The shield 23 may be a braided shield made of, for example, tin-plated soft copper wires. The shield 23 partially surrounds the first sheath 221 at the outside of the housing space 34. The shield 23 has a portion covered with the second sheath 222.

According to such a configuration, the strength and the noise resistance of the thermosensitive probe 1 are enhanced while securing the flexibility of the main body portion 2.

Also in this example, the thermosensitive probe 1 may include the coating layer 4 in the same manner as the first example illustrated in FIG. 2 or the second example illustrated in FIG. 3. In addition, similarly to the fourth example illustrated in FIG. 5, the hole 31a may be formed in the thermoconductive member 31.

Figure 9:
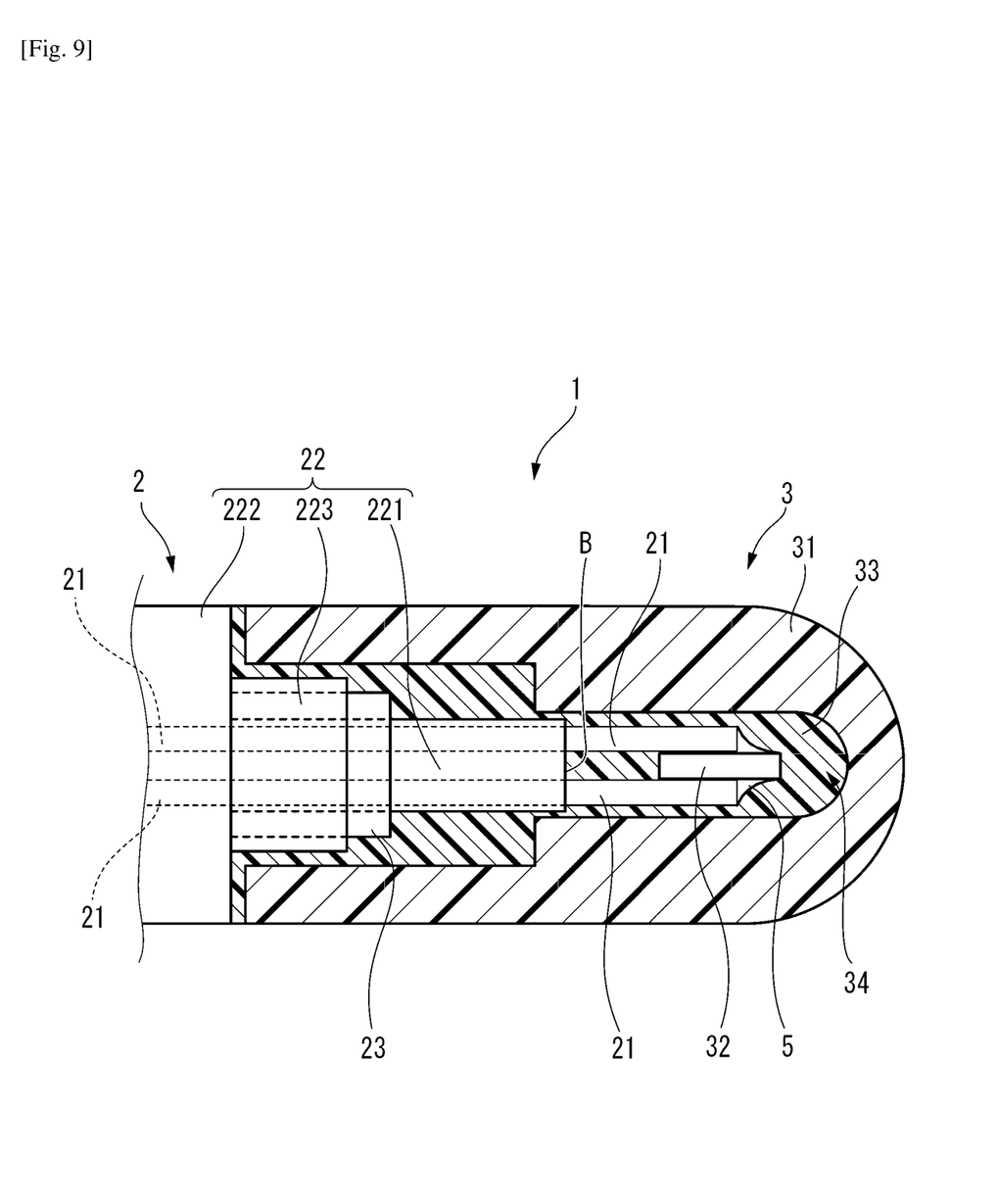
FIG. 9 illustrates an eighth example of the internal configuration of the thermosensitive probe of FIG. 1.

FIG. 9 illustrates an eighth example of the internal configuration of the thermosensitive probe 1 in a partial cross-sectional view. In this example, the sheath 22 further includes a third sheath 223. The third sheath 223 partially surrounds the first sheath 221 and the shield 23. The third sheath 223 has a portion surrounded by the second sheath 222. The third sheath 223 has an electrically insulative property. The third sheath 223 may be formed of, for example, a thermoplastic elastomer resin.

According to such a configuration, even in a configuration in which the conductive shield 23 is provided, it is possible to increase the insulative creepage distance. Accordingly, the electrically insulative property of the thermosensitive element 32 with respect to the outside is enhanced.

Also in this example, the thermosensitive probe 1 may include the coating layer 4 in the same manner as the first example illustrated in FIG. 2 or the second example illustrated in FIG. 3. In addition, similarly to the fourth example illustrated in FIG. 5, the hole 31a may be formed in the thermoconductive member 31.

In each of the examples described with reference to FIGS. 2 to 9, the outer diameter of the sheath 22 and the outer diameter of the thermoconductive member 31 coincide with each other.

According to such a configuration, it is possible to suppress a sense of discomfort that would be imparted due to the discontinuity between the sheath 22 and the thermoconductive member 31 when the thermosensitive probe 1 is in sliding contact with the subject. In a case where the coating layer 4 is formed, the sheath 22 and the thermoconductive member 31 may be smoothly coupled by way of the coating layer 4.

As illustrated in FIG. 1, the thermosensitive probe 1 may include a scale marker 6.

The scale marker 6 may be provided on at least one of the sheath 22 and the coating layer 4.

According to such a configuration, the degree of insertion of the thermosensitive probe 1 into the esophagus or the rectum of the subject can be easily recognized.

As indicated by dashed lines in FIG. 1, the thermosensitive probe 1 may include a casing 7 made of metal. The casing 7 is provided so as to at least partially surround the thermoconductive member 31. The casing 7 may be formed of, for example, stainless steel.

According to such a configuration, the thermosensitive probe 1 can be used to measure a body surface temperature of the subject. Specifically, the casing 7 is brought into contact with a body surface portion of the subject who wishes to be subjected to the temperature measurement. Heat of the portion is transferred to the thermosensitive portion 3 by way of the casing 7 and is sensed by the thermosensitive element 32.

Figure 10:
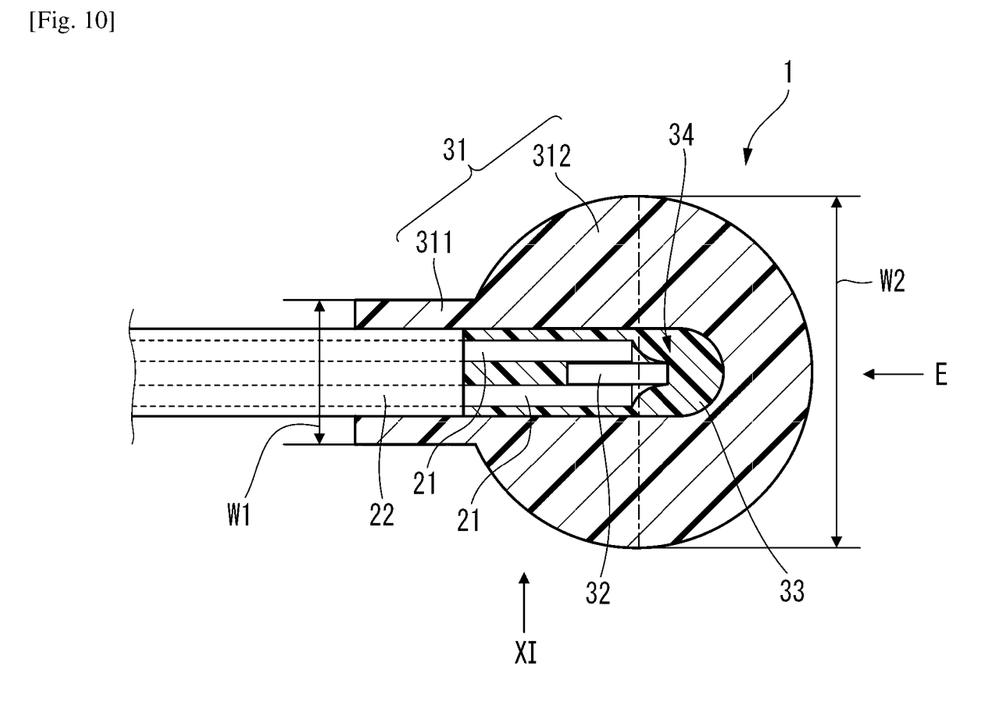
FIG. 10 illustrates a ninth example of the internal configuration of the thermosensitive probe of FIG. 1.
Figure 11:
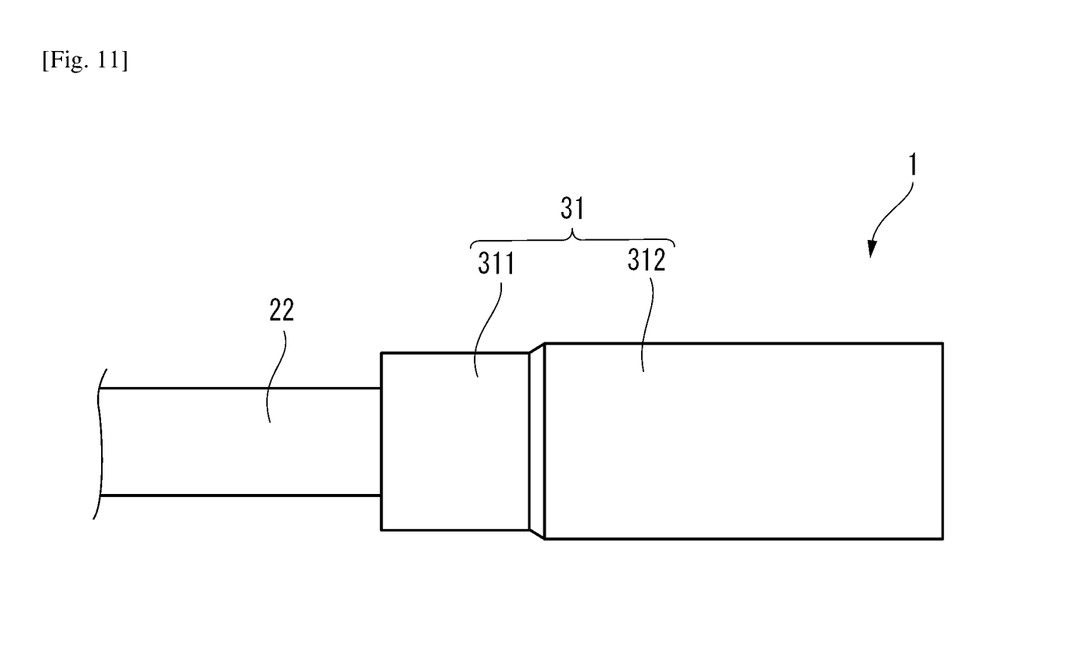
FIG. 11 illustrates an appearance of the thermosensitive probe as viewed from a direction along the arrow XI in FIG. 10.

FIG. 10 illustrates a ninth example of the internal configuration of the thermosensitive probe 1 in a partial cross-sectional view. FIG. 11 illustrates an appearance of the thermosensitive probe 1 as viewed from the direction of the arrow XI in FIG. 10. In this example, the thermoconductive member 31 has a first portion 311 and a second portion 312.

The first portion 311 at least partially covers the exterior surface of the sheath 22.

The first portion 311 has a first width W1 in the radial direction of the core wire 21. The second portion 312 has a second width W2 in the same direction. The second width W2 is larger than the first width W1. The thermosensitive element 32 is surrounded by the second portion 312.

Since the portion of the thermoconductive member 31 surrounding the thermosensitive element 32 is configured to have a wider width, it is possible to enhance the thermal inflow efficiency to the thermosensitive element 32 without using other components such as the casing 7 described above. On the other hand, since the exterior surface of the sheath 22 is partially covered with the thermoconductive member 31, the amount of heat that may flow from the thermosensitive element 32 to the sheath 22 through the core wire 21 can be suppressed. As a result, it is possible to improve the effect of suppressing the influence of the ambient temperature on the thermosensitive element 32.

If the relationship between the first width W1 and the second width W2 is maintained, the shape of the thermoconductive member 31 illustrated in FIGS. 10 and 11 can be appropriately changed.

From the viewpoint of increasing the thermal inflow efficiency to the thermosensitive element 32, it is preferable that a cross-section of a portion of the thermoconductive member 31 where the width along the radial direction of the core wire 21 is maximum (a portion indicated by chain lines in FIG. 10) as viewed from the direction in which the core wire 21 extends (the direction of the arrow E) intersects the thermosensitive element 32.

The above-described embodiments are merely examples for facilitating understanding of the presently disclosed subject matter. The configuration according to the above embodiments can be appropriately modified without departing from the gist of the presently disclosed subject matter.

The present application is based on Japanese Patent Application No. 2019-218547 filed on Dec. 3, 2019, the entire contents of which are hereby incorporated by reference.

The invention claimed is:

1. A thermosensitive probe comprising:
a non-metallic thermoconductive member defining a housing space;
a thermosensitive element disposed in the housing space;
a coupling member having a portion surrounding the thermosensitive element in the housing space while fixing the thermosensitive element to the thermoconductive member;
an electrically conductive core wire electrically connected to the thermosensitive element;
an electrically insulative sheath partially surrounding the core wire; and
an electrically insulative coating layer provided in at least a region extending over the electrically insulative sheath and the thermoconductive member, wherein
the electrically insulative coating layer is directly fixed to the thermoconductive member and the electrically insulative sheath, and the thermoconductive member is entirely covered with the electrically insulative coating layer;
wherein a thermal conductivity of the sheath is lower than the thermal conductivity of the coupling member.

2. The thermosensitive probe according to claim 1,
wherein a thermal conductivity of the thermoconductive member is higher than a thermal conductivity of the coupling member.

3. The thermosensitive probe according to claim 1,
wherein a scale marker is provided in at least one of the coating layer and the electrically insulative sheath.

4. The thermosensitive probe according to claim 1,
wherein the electrically insulative sheath and the thermoconductive member are coupled by way of the coupling member.

5. The thermosensitive probe according to claim 1,
wherein the thermoconductive member is formed with a hole communicating the housing space with the outside of the thermoconductive member and filled with a portion of the coupling member.

6. The thermosensitive probe according to claim 1,
wherein the thermoconductive member has an end portion formed with an opening communicated with the housing space; and
wherein a boundary between the core wire and the electrically insulative sheath is located between the end portion and the thermosensitive element.

7. The thermosensitive probe according to claim 6,
wherein the boundary is located in the housing space.

8. The thermosensitive probe according to claim 6,
wherein the electrically insulative sheath includes a first sheath forming the boundary, and a second sheath coupled to the thermoconductive member.

9. The thermosensitive probe according to claim 8, comprising:
an electrically conductive shield having a portion that partially surrounds the first sheath, and that is surrounded by the second sheath.

10. The thermosensitive probe according to claim 9, comprising:
an electrically insulative third sheath that partially surrounds the first sheath and the shield, and that is surrounded by the second sheath.

11. The thermosensitive probe according to claim 8,
wherein the first sheath is formed of a material containing a fluorine resin.

12. The thermosensitive probe according to claim 6,
wherein the core wire and the thermosensitive element are coupled with a low-temperature solder.

13. The thermosensitive probe according to claim 1,
wherein an outer diameter of the sheath and an outer diameter of the thermoconductive member coincide with each other.

14. The thermosensitive probe according to claim 1, comprising:
a metallic casing at least partially surrounding the thermoconductive member.

15. The thermosensitive probe according to claim 1,
wherein the thermoconductive member includes:
a first portion partially surrounding the sheath, and having a first width in a radial direction of the core wire; and
a second portion having a second width that is larger than the first width in the radial direction of the core wire; and
wherein the thermosensitive element is arranged so as to be surrounded by the second portion.

* * * * *